(12) United States Patent
Franke et al.

(10) Patent No.: US 7,441,759 B2
(45) Date of Patent: Oct. 28, 2008

(54) ELASTOMERIC BUSH BEARING AND PROCESS FOR MANUFACTURING SAME

(75) Inventors: Tim-Malte Franke, Damme (DE); Christine Schumacher, Damme (DE); Claudia Hartfiel, Bramsche (DE); Nicole Cieslack, Wetschen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/530,047

(22) Filed: Sep. 8, 2006

(65) Prior Publication Data

US 2007/0085253 A1 Apr. 19, 2007

(30) Foreign Application Priority Data

Sep. 9, 2005 (DE) .................. 10 2005 043 234

(51) Int. Cl.
*B60G 11/22* (2006.01)
(52) U.S. Cl. ...................... 267/282; 267/279
(58) Field of Classification Search ... 267/141.1–141.7, 267/280–283, 293, 279; 464/89; 403/228
See application file for complete search history.

(56) References Cited

U.S. PATENT DOCUMENTS

| 3,140,081 | A | * | 7/1964 | Peterson | ...................... 267/153 |
|---|---|---|---|---|---|
| 3,147,964 | A | * | 9/1964 | Wolf | ........................... 267/292 |
| 3,666,301 | A | * | 5/1972 | Jorn | ........................... 403/228 |
| 4,007,924 | A | * | 2/1977 | Jorn et al. | .................... 267/282 |
| 4,605,207 | A | * | 8/1986 | Konishi | ....................... 267/281 |
| 4,634,108 | A | * | 1/1987 | Munch | ........................ 267/279 |
| 5,996,981 | A | * | 12/1999 | Dilling | ........................ 267/153 |
| 6,267,680 | B1 | * | 7/2001 | Girard et al. | ................. 464/89 |
| 6,513,801 | B1 | * | 2/2003 | McCarthy | .................... 267/293 |
| 2003/0057622 | A1 | * | 3/2003 | Bovio et al. | ................. 267/281 |
| 2005/0153781 | A1 | * | 7/2005 | Buhl et al. | ..................... 464/89 |
| 2006/0012092 | A1 | * | 1/2006 | Siemer et al. | ............ 267/141.2 |

FOREIGN PATENT DOCUMENTS

| DE | 1525131 | 10/1969 |
|---|---|---|
| DE | 1955308 | 5/1971 |

* cited by examiner

*Primary Examiner*—Christopher P Schwartz
(74) *Attorney, Agent, or Firm*—McGlew & Tuttle, P.C.

(57) ABSTRACT

An elastomeric bush bearing is designed as a slotted bush. To reach a high ratio of static radial stiffness to torsion spring rate along with a high axial stiffness at the same time, a beading is formed at least at one axial end but preferably at both axial ends of the slotted bush. In case of an especially advantageous embodiment, a slotted bush with additional intermediate parts inserted into the elastomeric bearing body, two encapsulated rubber packets are created by the simultaneous special geometric design of the inner part. The individual stiffnesses of the two rubber packets are thus compensated and thus there is a homogeneous increase in the overall stiffness of the bush. The beadings are prepared before the components of the bearing are assembled and vulcanized to the parts of the later outer sleeve.

18 Claims, 3 Drawing Sheets

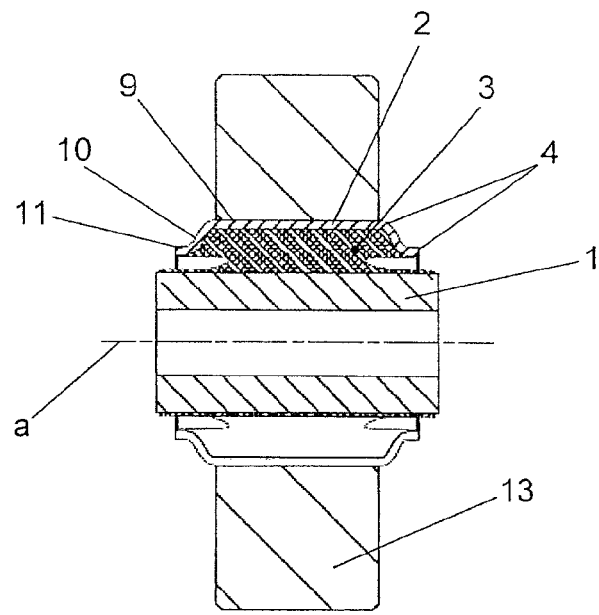
Fig. 1a
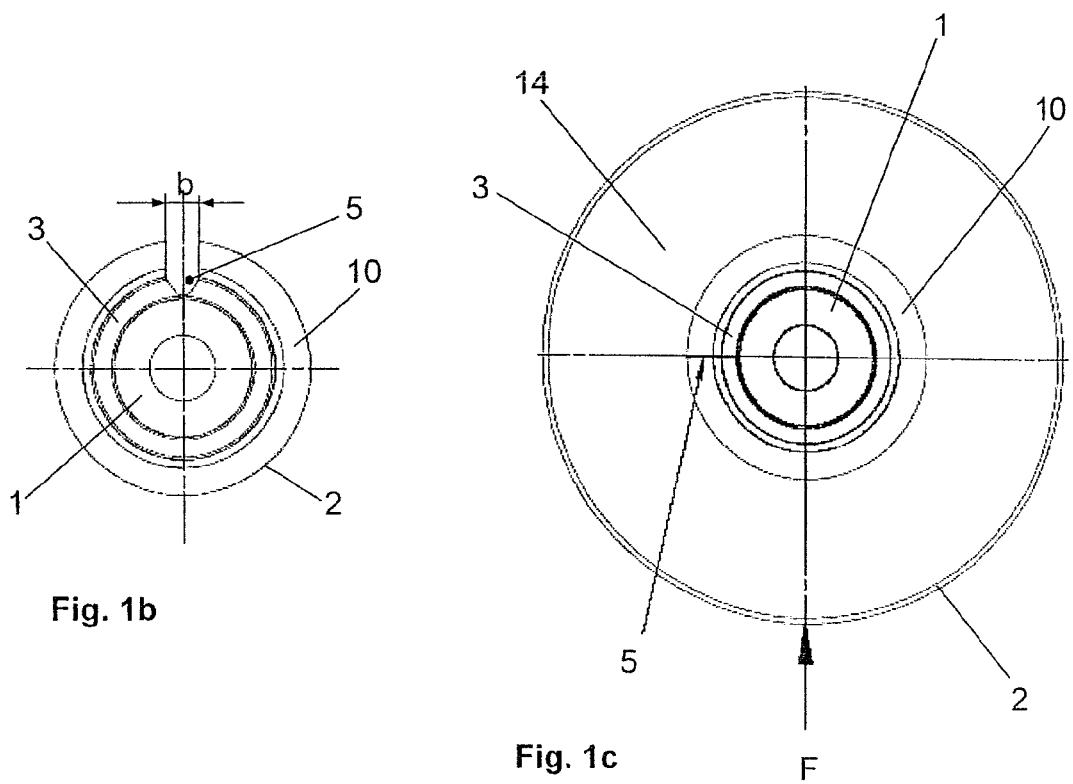
Fig. 1b
Fig. 1c

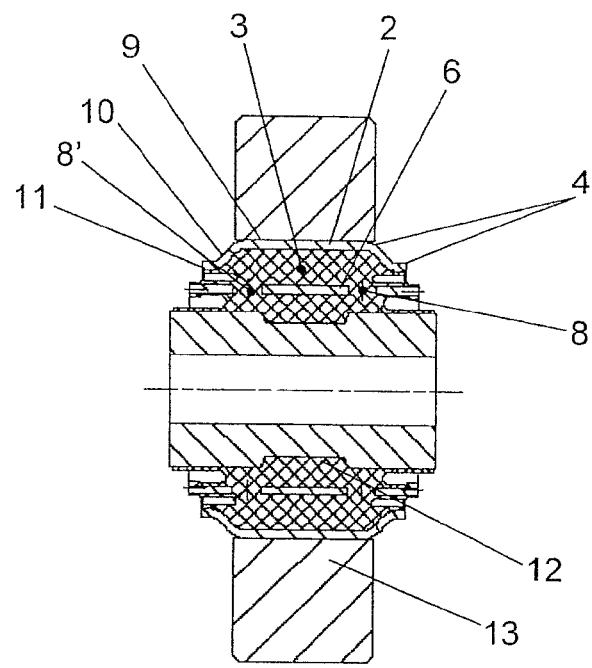
Fig. 3a
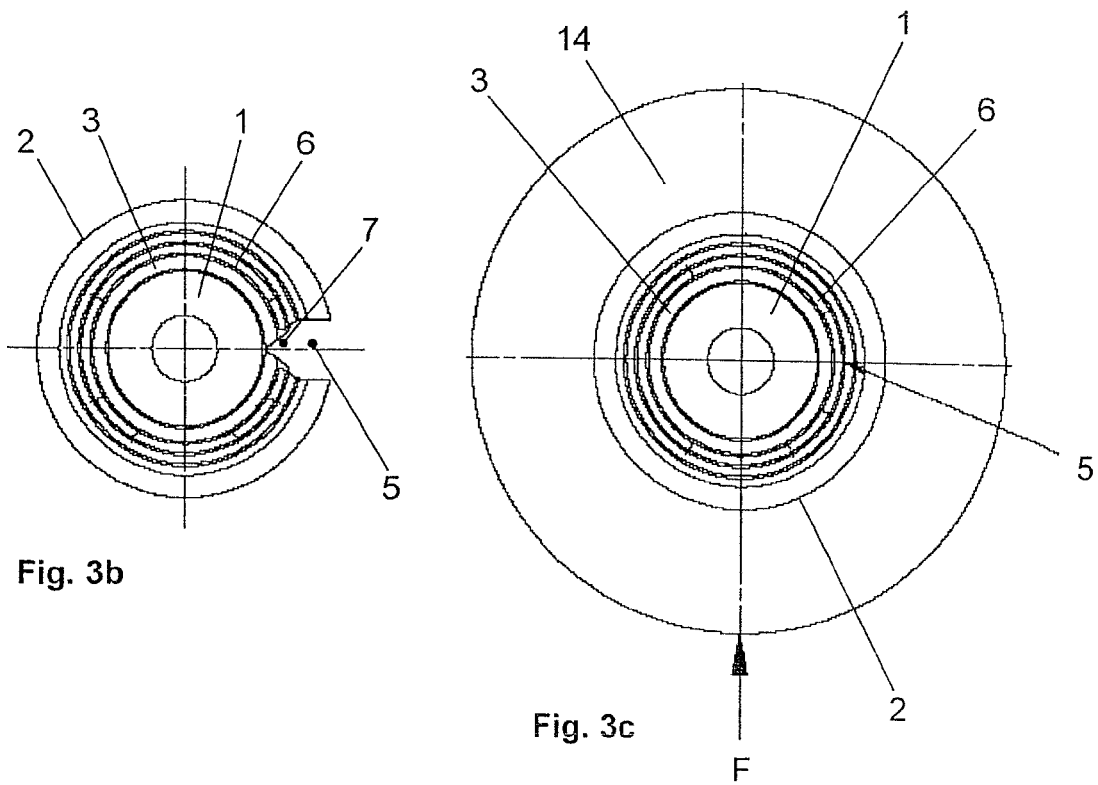
Fig. 3b
Fig. 3c

ELASTOMERIC BUSH BEARING AND PROCESS FOR MANUFACTURING SAME

CROSS REFERENCE TO RELATED APPLICATIONS

This application claims the benefit of priority under 35 U.S.C. § 119 of German Patent Application DE 10 2005 043 234.4 filed Sep. 9, 2005, the entire contents of which are incorporated herein by reference.

FIELD OF THE INVENTION

The present invention pertains to an elastomeric bush bearing, which is designed as a slotted bush. It consequently pertains to a bush bearing in which the outer sleeve and possible intermediate parts or insert plates inserted between the inner part of the bearing and the outer sleeve of the bearing have at least one axially extending longitudinal slot. The present invention pertains, furthermore, to a process for manufacturing such a bush.

BACKGROUND OF THE INVENTION

Rubber bushes of different designs depending on their particular function are used at different points above all in vehicle construction. An essential field of use is the mounting of parts of the wheel suspension and of the suspension arms. The vehicle manufacturer requires, in general, a high radial stiffness with a simultaneously low torsion spring rate for the bush bearings used to mount the suspension arms. The bush bearings shall effectively damp forces introduced radially, but they shall make it possible for the suspension to be able to move easily up and down.

A good ratio of the radial stiffness to the torsion spring rate is achieved by the use of slotted bushes. Like other elastomeric bush bearings as well, such bushes comprise an essentially cylindrical inner part, an outer sleeve concentrically surrounding the inner part and an elastomeric bearing body, which is arranged between the inner part and the outer sleeve and is connected at least to the two parts by vulcanization. Depending on the embodiment, one or more intermediate parts or intermediate plates are optionally arranged between the inner part and the outer sleeve. In bush bearings that are designed as slotted bushes, the outer sleeve and the optionally present intermediate parts have at least one axially extending longitudinal slot. The slot advantageously leads to a reduction of the shrinkage stresses after the vulcanization of the bearing parts. The diameter of the outer sleeve is reduced in the course of a calibration operation following the vulcanization. The slot is at least extensively closed as a result and a prestress is applied to the elastomeric bearing body, as a result of which the radial stiffness of the bearing increases. A higher degree of calibration is possible now due to the slot. As a result, softer blends or elastomers with lower Shore hardness can be used for the bearing body to reduce the torsion spring rate, and the bearing body will nevertheless have a high static radial stiffness based on the high degree of calibration. The ratio of the static radial stiffness to the torsion spring rate is consequently advantageously increased. The greater the angle of the notch opening forming the slot, i.e., the width of the slot, the greater is the radial stiffness of the bearing that can be set in the course of the calibration. However, the value of this angle and consequently of the outer width of the slot are limited, because there is a risk that the rubber forming the elastomeric bearing body will stream out in case of an excessively great slot width.

A slotted bush of this class is described, for example, in DT 19 55 308.

An increase in the radial stiffness can be achieved, furthermore, by the already mentioned use of intermediate parts, which are inserted into the bearing body between the inner part and the outer sleeve. This is also disclosed already by DT 19 55 308 cited above. To achieve the highest possible radial stiffness, a plurality of such intermediate parts are also rather frequently arranged concentrically with one another. However, a limit is set here by the space available at the site of installation of the bearing. Moreover, the use of a plurality of intermediate parts is difficult in terms of manufacturing technology and therefore also leads to higher manufacturing costs, besides to increased material costs. In addition, the risk of development of adhesion errors between the intermediate parts and the elastomer increases with increasing number of intermediate parts.

A bush bearing with a slot, in which a collar is formed at the axial ends of the outer sleeve to increase the axial stiffness of the bush bearing, is known from DT 15 25 131. However, compared with this, the slotted bushes known from the state of the art so far have only a comparatively low axial stiffness for manufacturing technological reasons. As a result, there is a risk that elastomeric slotted bushes used to mount the suspension arm will migrate axially outwardly when higher axial loads occur. It is desirable from this point of view that slotted bushes also have the highest possible axial stiffness. The possibility of penetration of dirt from the axial direction also represents a problem in the slotted bushes known from the state of the art.

SUMMARY OF THE INVENTION

The basic object of the present invention is to provide a design of an elastomeric slotted bush such that while the manufacturing technical effort is low, the slotted bush has the highest possible ratio of static radial stiffness to torsion spring rate and preferably also the highest possible axial stiffness. The object is, furthermore, to propose a process for manufacturing such a bearing.

The elastomeric bush bearing proposed to accomplish the object comprises an essentially cylindrical inner part, an outer sleeve concentrically surrounding the inner part and an elastomeric bearing body, which is arranged between the inner part and the outer sleeve and is connected to them by vulcanization. Since the bearing is designed as a slotted bush, at least one slot extending over the entire length of the outer sleeve in the axial direction (axial slot) is formed in its outer sleeve. In a manner that is essential for the present invention, the outer sleeve of the bearing consisting of a metal or a plastic has a beading at least one of its axial ends, unlike the slotted bushes known from the state of the art. In the course of the calibration operation, during which the diameter of the outer sleeve is reduced and the axial slot of the bearing is extensively closed in the process, the bearing also undergoes, because of the axial flange or the axial flanges, besides the radial calibration, also an axial calibration, by which a prestress acting in the axial direction is applied to the elastomeric bearing body. The axial stiffness of the bearing advantageously increases markedly as a result. However, the radial stiffness of the bearing also increases further at the same time due to the beading, while the torsion spring rate continues to be low. The bearing is usually provided with beading axially on both sides in practice, so that mainly embodiments with bilateral beading will be considered below. In exceptional cases, namely, when the bearing is installed with one of its axial ends against an axial stop face, an embodiment with beading at only one of the axial ends would be possible as well. Such an embodiment shall also be included in the protection. However, the outer sleeve of the bearing has a beading bilaterally for the principal application being considered here, namely, the mounting of the control arms of motor vehicles.

However, independently herefrom, embodiments of the slotted bush according to the present invention may be provided in which intermediate parts are arranged between the inner part and the outer sleeve of the bearing to further increase the radial stiffness. These intermediate parts, which are preferably metal plates, likewise have axial slots, which are arranged at the same position relative to the circumference of the bearing as the axial slots in the outer sleeve. Moreover, for manufacturing technical reasons, such intermediate parts preferably have perforations, through which the elastomer can pass during the injection or during the vulcanization operation. It is thus guaranteed that the elastomer or the rubber will be distributed uniformly radially on both sides of the intermediate parts.

Furthermore, embodiments of the bearing according to the present invention are provided, in which the outer sleeve and optionally present intermediate parts have an axially two-part or multipart design. It is thus possible to embody a plurality of axially extending slots. The axial slots formed in the outer sleeve of the bearing are shaped such according to a preferred embodiment of the present invention that their width decreases in the radially outward direction. In view of the fact that the outer sleeve has a certain material thickness, this ensures that the slots will be completely closed after the calibration and the installation of the bearing in a mounting eye and the elastomer is prevented from escaping through the slots.

The axial beadings of the outer sleeve are embodied, corresponding to a preferred embodiment, by reducing the diameter of the outer sleeve at its axial ends. The jacket surface of the outer sleeve now passes over (transitions) from a surface section extending in parallel to the bearing axis into a short, at least predominantly radially extending surface section and from this into an end section likewise extending in parallel to the axis of the bearing. The material forms a radius each in the area of the transitions between the surface sections.

In another possible embodiment, the inner part of the bush bearing according to the present invention has sections with different diameters, wherein the diameter of the inner part is preferably reduced in an axially central section compared to the sections adjoining this section on both sides. In particular, as will still be explained below, the overall radial stiffness can be advantageously affected hereby especially in bearings with additionally inserted intermediate parts. However, it may optionally also be possible as a result to provide the bearing with different radial stiffnesses relative to its axial extension. The outer sleeve of the bearing preferably has a beading at its axial ends already before assembly or vulcanization to the inner part and the bearing body.

The process suitable for forming the bearing according to the present invention has the following process steps:

forming the parts providing the outer sleeve of the bearing as stamped sheet metal parts or plastic parts, with bulges to form beads on the sides of the part or parts forming the later outer sleeve, which sides are axial sides relative to the installation in the bearing. The beads are formed in the course of the injection molding process in the case of plastic parts and preferably but not obligatorily during the stamping process in the case of stamped sheet metal parts, but in any case before the mounting of the bearing;

surrounding a metallic, cylindrical inner part with the stamped or injection-molded parts provided with the beads, which form the outer sleeve, within a vulcanization mold; and injecting the elastomer between the inner part and the outer sleeve with the subsequent vulcanization process; and calibrating the bearing by reducing the diameter of its outer sleeve, while the axial slots in the outer sleeve of the bearing are extensively closed.

Depending on the particular application, additional intermediate parts preferably consisting of sheet metal are arranged, according to another embodiment of the process, between the inner part and the outer sleeve before the injection of the elastomer.

The present invention will be explained once again below on the basis of exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1a is an axial sectional view of a general embodiment of the present invention;

FIG. 1b is a top view of an axial front surface of the slotted bush according to FIG. 1a before the calibration;

FIG. 1c is a top view of an axial front surface of the slotted bush according to FIG. 1a after the calibration;

FIG. 3a is a sectional view showing an embodiment with intermediate parts and with an inner part of a modified shape;

FIG. 3b is a top view of an axial front surface of the embodiment according to FIG. 3a before the calibration; and FIG. 3c is a top view of an axial front surface of the embodiment according to FIG. 3a after the calibration.

DESCRIPTION OF THE PREFERRED EMBODIMENTS

Figure 2A:
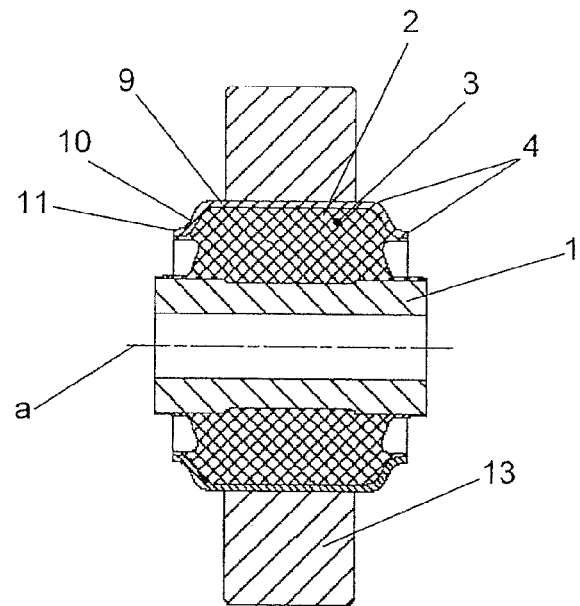
FIG. 2a is an axial sectional view of an embodiment with an axially multipart outer sleeve.

Referring to the drawings in particular, FIG. 1a shows a general embodiment of the bearing according to the present invention in an axially cut-away view. Corresponding to its preferred intended use, the bearing is received by the mounting eye 13 of the control arm of a motor vehicle. The bearing comprises essentially a metallic, hollow cylindrical inner part 1, the outer sleeve 2 concentrically surrounding the inner part 1 and the elastomeric bearing body 3 arranged between the inner part 1 and the outer sleeve 2.

According to the present invention, the outer sleeve 2 of the bearing has a beading 4 at its two axial ends. These beadings (a bending such as a bending at first and second locations) 4 were formed already before the bearing components were connected, i.e., before the elastomer was injected between the inner part 1 and the outer sleeve 2 and the vulcanization process. The beadings 4 are prepared such that a surface section 9 of the outer sleeve 2, which surface section extends in parallel to the bearing axis a and is in contact with the inner wall of the mounting eye of the control arm 13 in the drawing, is adjoined on both sides by an essentially radially extending surface section 10 and this surface section 10 is adjoined, in turn, by a surface section 11 extending in parallel to the bearing axis a. Consequently, the outer sleeve 2 has, in the area of the latter surface section 11, i.e., the axial end surface, a reduced diameter compared to the section 9 that is in contact with the inner wall of the mounting eye. The transition between the individual surface sections 9, 10, 11 is formed by a radius (bend) each formed in the material. It is achieved due to the straight end surfaces 11 of the outer sleeve 2 that the component can be pressed off reliably during the vulcanization operation in the area of the axial ends, so that the escape of rubber, which would flow over the front surface and onto the outer surface of the outer sleeve 2, is prevented from occurring.

FIG. 1*b* shows a top view of one of the axial front surfaces of the bearing according to FIG. 1*a* before the calibration. The slot 5, which is formed in the outer sleeve 2 and extends axially over the entire outer sleeve 2, is recognizable in this view. The elastomer or the rubber is injected during the manufacture of the bearing via this axial slot 5 into the intermediate space, which is present between the inner part 1 and the outer sleeve 2 surrounding the inner part 1. The inner part 1, the bearing body 3 and the outer sleeve 2 are adheringly connected to one another by a vulcanization operation. The bearing is then removed from the vulcanization mold and calibrated by reducing the diameter of its outer sleeve 2.

FIG. 1*c* shows the bearing after the calibration, likewise in a top view of an axial front surface, the bearing being inserted here into a so-called testing bush 14 for testing. An axial prestress is applied to the bearing body 3 via the beading 4 of the outer sleeve 2 in the course of the calibration of the bearing, during which the axial slot 5 is extensively closed. The axial stiffness is advantageously markedly increased hereby compared to the slotted bushes known from the state of the art. The torsion spring rate nevertheless remains low. In addition, the radial stiffness of the bearing, i.e., its stiffness in relation to a force F acting from the radial direction, is advantageously increased further by the axial beading 4.

Figure 2B:
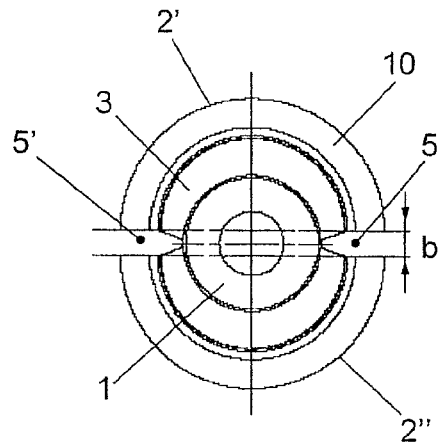
FIG. 2b is a top view of an axial front surface of the embodiment according to FIG. 2a before the calibration.
Figure 2C:
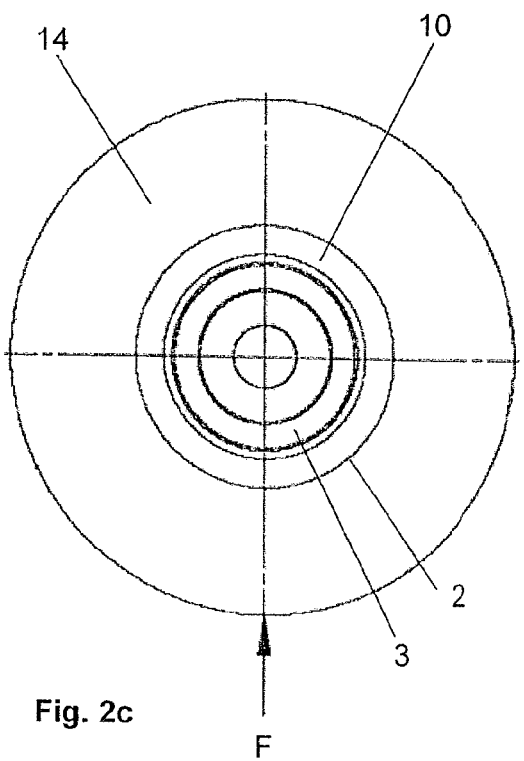
FIG. 2c is a top view of an axial front surface of the embodiment according to FIG. 2a after the calibration.

FIGS. 2*a* through 2*b* show an embodiment of the slotted bush according to the present invention, in which the outer sleeve 2 has an axially two-part design. This means that the outer sleeve 2 is formed by two shells 2', 2", between which two axial longitudinal slots 5, 5' are arranged. However, according to the basic idea of the present invention, these two half shells 2', 2" are also provided with a beading 4 axially on both sides. FIG. 2*a* shows the bearing again in an axial section, while it is shown in FIGS. 2*a* and 2*c* before the calibration (FIG. 2*b*) and after the calibration (FIG. 2*c*) in a top view of an axial front surface. It can be recognized from FIG. 2*b* that because of the axially two-part outer sleeve 2, the bush has two axial slots 5, 5'. However, these are also extensively closed during the calibration of the bearing, but they are closed basically completely, at any rate, after insertion into an intended mounting eye of a vehicle control arm 13. The bearing is again inserted into a testing bush 14 in FIG. 2*b*, comparably to the installation situation at the control arm 13.

Another embodiment is shown in FIGS. 3*a* through 3*c*, in which the bearing is again shown in an axial section in FIG. 3*a* before and after the calibration and insertion into a testing bush 14 in FIGS. 3*b* and 3*c*, respectively, in a top view of an axial front surface. To further increase the radial stiffness of the bush, an additional intermediate part 6 is inserted into the bearing body 3 between the inner part 1 and the outer sleeve 2 in this embodiment. The intermediate part 6 consists of steel, aluminum or a plastic. As is apparent from FIG. 3*b*, it has an axial slot 7 in the same location as the outer sleeve 2. A further increase in the radial stiffness can be achieved by introducing additional intermediate parts, which are arranged concentrically with the intermediate part 6 shown in the example and now likewise have an axial slot in the same circumferential position.

However, the bearing shown in the example has only one intermediate part 6, so that a bearing with two rubber packets arranged concentrically with one another is formed. In connection with a special design of the inner part 1, which can be recognized in FIG. 3*a*, and the axially bilateral beading 4 of the outer sleeve 2, the radial stiffness of the bearing can be affected especially well. As can be recognized from FIG. 3*a*, the inner part 1 of the bearing has, according to the exemplary embodiment shown, a section 12 with reduced diameter in an axially central area. The radially outer rubber packet of the slotted bush is quasi encapsulated by the bilateral beading 4, so that the radial stiffness [of this rubber packet] is increased compared to bearings of a conventional design, i.e., without axial beading 4. However, the radially inner rubber packet is at the same time encapsulated by the inner part and the outer rubber packet because of the special design of the inner part 1. The individual stiffnesses of the two rubber packets are compensated as a result and the overall radial stiffness is thus increased homogeneously. Thus, an even higher radial stiffness and consequently an increase in the ratio of the radial stiffness to the torsion spring rate can be achieved. In addition, the axial stiffness increases due to the beading 4. In addition, the bearing will have a longer service life because of the encapsulation of its rubber packets, because increased progression of damping is given with increasing spring excursion, radially and/or axially. The rubber bearing shown in FIGS. 3*a* through 3*c* is designed for low cardanic angles.

The hollow cylindrical inner part 1 of the bearing consists of steel or aluminum and its outer sleeve 2 of steel, aluminum or a plastic in all the embodiments that were explained above and are shown in FIGS. 1 through 3.

While specific embodiments of the invention have been shown and described in detail to illustrate the application of the principles of the invention, it will be understood that the invention may be embodied otherwise without departing from such principles.

What is claimed is:

1. An elastomeric bush bearing, comprising:
   a cylindrical inner part
   an outer sleeve with a slot extending in an axial direction over an entire length of said outer sleeve from one axial end to another axial end, said outer sleeve concentrically surrounding said inner part, said outer sleeve having a central surface section;
   a bearing body arranged between said inner part and said outer sleeve and connected to each of said inner part and said outer sleeve by vulcanization, one beading being formed at said one axial end and another beading being formed at said another axial end of said outer sleeve, each beading being of a reduced radial diameter such that said outer sleeve has a radial diameter at each said beading that is less than a radial diameter of said outer sleeve at said central surface section, said inner part having, axially centrally, a section with a reduced diameter compared to sections adjoining said section with reduced diameter on sides of said section with said reduced diameter, said section with said reduced diameter being axially arranged between said one beading and said another beading.

2. An elastomeric bush bearing in accordance with claim 1, further comprising:

an intermediate part with an axial slot, said intermediate part being spaced radially from and arranged between said inner part and said outer sleeve, said intermediate part being inserted into said elastomeric bearing body adjacent to said inner part, wherein said axial slot of said intermediate part is arranged in relation to a circumference of the bearing in substantially the same position as said slot in said outer sleeve.

3. An elastomeric bush bearing in accordance with claim 2, wherein said outer sleeve and said intermediate part have an axially two-part or multipart design, so that the bearing has a plurality of said axially extending slots.

4. An elastomeric bush bearing in accordance with claim 1, wherein said intermediate part has one or more perforations.

5. An elastomeric bush bearing in accordance with claim 1, wherein said outer sleeve has an axially two-part or multipart design defining said slot and at least one other axially extending slot.

6. An elastomeric bush bearing in accordance with claim 1, wherein a width of said slot of said outer sleeve decreases from radially inwardly to radially outwardly.

7. An elastomeric bush bearing in accordance with claim 1, wherein said beading of said outer sleeve is formed by a tapering of the diameter of said outer sleeve with a jacket surface of said outer sleeve having a bend passing over from said central surface section extending in parallel to a bearing axis into a surface section extending at least principally radially inwardly and having a bend passing over from said section extending at least principally radially inwardly to an end surface that extends in parallel to said bearing axis.

8. An elastomeric bush bearing in accordance with claim 1, wherein said bearing body engages said section of said reduced diameter of said inner part.

9. An elastomeric bush bearing in accordance with claim 1, wherein said outer sleeve of said bush bearing has another beading to provide a beading at each of said axial ends, said beading being provided prior to mounting and vulcanization to said inner part to said bearing body.

10. An elastomeric bush bearing in accordance with claim 1, wherein said beading has an axial length that is less than an axial length of said surface section.

11. An elastomeric bush bearing in accordance with claim 1, wherein said beading has an axial length that is less than an axial length of said surface section.

12. An elastomeric bush bearing, comprising:
a cylindrical inner part;
an outer sleeve with a slot extending in an axial direction over an entire length of said outer sleeve from one axial end to another axial end, said outer sleeve concentrically surrounding said inner part;
a bearing body arranged between said inner part and said outer sleeve and connected to each of said inner part and said outer sleeve by vulcanization, said outer sleeve having a central surface section, said central surface section being parallel to said cylindrical inner part, said outer sleeve having a bend at said one axial end and a bend at said another axial end such that a radial dimension of said outer sleeve at said one axial end and at said another axial end is less than a radial dimension of said outer sleeve at said central surface section, said inner part having an inner part surface defining a first inner part section and a second inner part section, said first inner part section being located at an axially central location of said inner part, said second inner part section being located at an axial end of said inner part, said first inner part section having a radial dimension that is less than a radial dimension of said second inner part section, said first inner part section being axially arranged between said bend at said one axial end and said bend at said another axial end.

13. An elastomeric bush bearing in accordance with claim 12, wherein said outer sleeve has another bend at said one axial end and another bend at said another axial end to provide said outer sleeve with a jacket surface with said central surface section extending in parallel to a bearing axis and at each end thereof a surface section extending at least principally radially inwardly followed axially outwardly by an end surface that extends in parallel to said bearing axis.

14. A process for manufacturing an elastomeric bush bearing designed as a slotted bush, the process comprising:
providing a cylindrical metallic inner part and an axially slotted one-part or multipart outer sleeve for concentrically surrounding said inner part, said outer sleeve having a central surface, said cylindrical inner part having an outer inner part surface, said outer inner part surface defining a first inner part section having a first inner part radial dimension and a second inner part section having a second inner part radial dimension, said first inner part radial dimension being less than said second inner part radial dimension, said first inner part being located at an axially central area of said inner part;
surrounding said metallic inner part with the one or more parts forming said outer sleeve;
injecting an elastomer between said inner part and said outer sleeve to form a bearing body such that said bearing body is adheringly connected to and between said inner part and said outer sleeve in a vulcanization process to form an non calibrated bearing;
calibrating the non calibrated bearing by reducing the diameter of said outer sleeve, wherein the one or more parts forming said outer sleeve of the bearing are beaded at one axial end and another axial end of said outer sleeve before they are connected to the other components of the bearing such that a radial dimension of said outer sleeve at said one axial end and said another axial end is less than a radial dimension of said outer sleeve at said central surface section, said first inner part section of said inner part being located between said one axial end and said another axial end.

15. A process in accordance with claim 14, wherein said bearing body engages said first inner part section.

16. A process in accordance with claim 15, wherein said bearing body engages said second inner part section.

17. A process in accordance with claim 14, further comprising providing one or more intermediate parts inserted between said inner part and said outer sleeve before the elastomer is injected into the intermediate space.

18. A process in accordance with claim 14, wherein said beading has an axial length that is less than an axial length of said central surface.

* * * * *